(No Model.)  2 Sheets—Sheet 2.
B. D. SOUTHARD.
ARMATURE FOR DYNAMOS OR ELECTRIC MOTORS.
No. 463,174.  Patented Nov. 17, 1891.
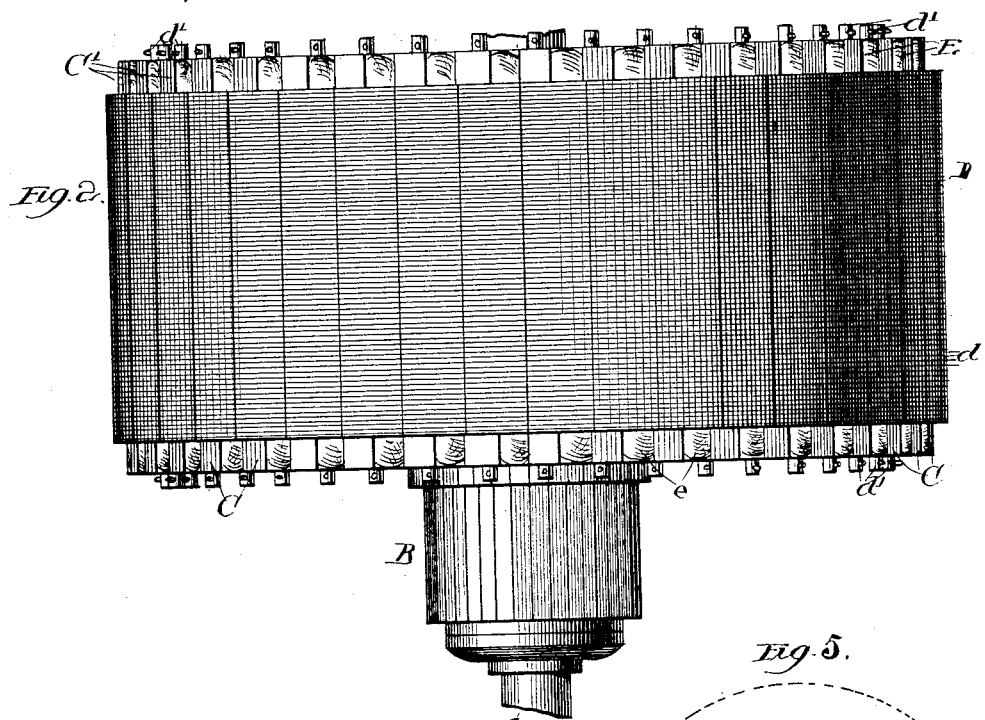
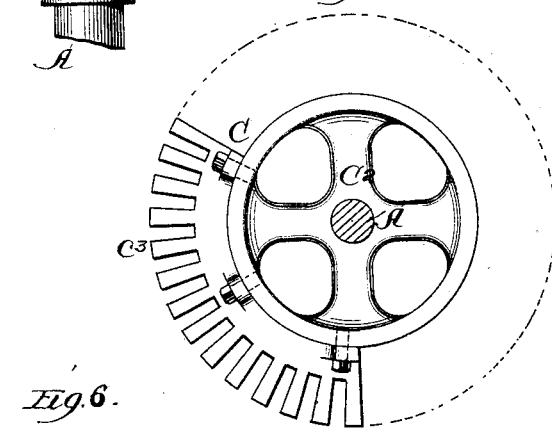
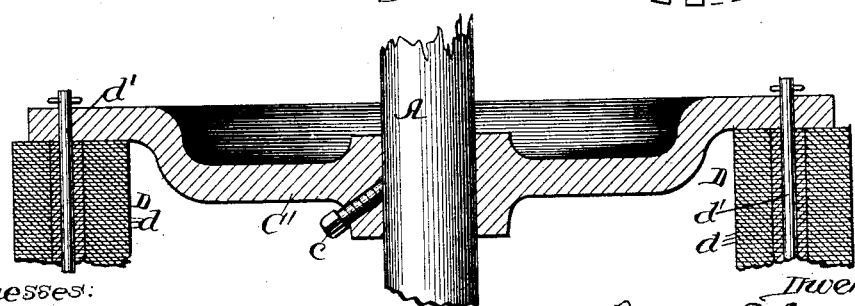

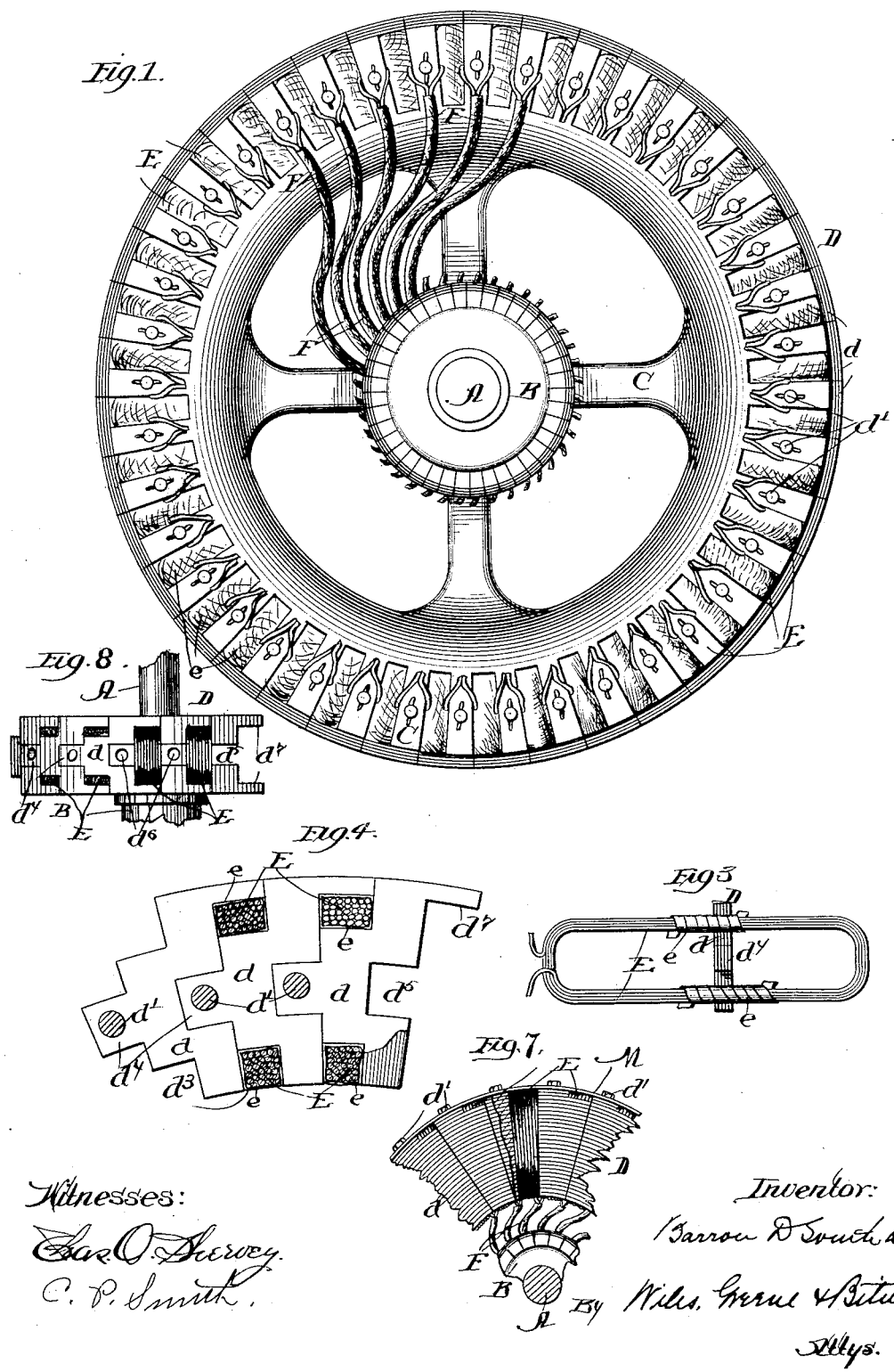

UNITED STATES PATENT OFFICE.

BARRON D. SOUTHARD, OF CHICAGO, ILLINOIS, ASSIGNOR TO THE CHICAGO ELECTRIC MOTOR COMPANY, OF SAME PLACE.

ARMATURE FOR DYNAMOS OR ELECTRIC MOTORS.

SPECIFICATION forming part of Letters Patent No. 463,174, dated November 17, 1891.

Application filed March 2, 1891. Serial No. 383,352. (No model.)

*To all whom it may concern:*

Be it known that I, BARRON D. SOUTHARD, a citizen of the United States of America, residing at Chicago, in the county of Cook and State of Illinois, have invented certain new and useful Improvements in Armatures for Dynamos or Electric Motors, of which the following is a specification.

My invention relates to certain structural improvements applicable to armatures designed for use in dynamos or electric motors. More particularly it pertains to that class of armatures known as the "Gramme" or "ring" armatures. In this class of armatures the wire is wound longitudinally upon the outer surface of a hollow cylindrical core or ring, returning through the interior of the latter until the entire surface of the armature or such portions thereof as may be desired are completely covered by several layers of the wire. A series of wires radiating from the commutator connect at different points with the wire wound upon the ring, dividing the latter into a number of coils connected in series, the end of each coil and the commencement of the succeeding coil being connected with the same part of the commutator. It will readily be seen that in case any one of these coils burns out or is otherwise injured, so as to necessitate replacing it with new wire, it is a job of no little difficulty to unwind the coil from the ring and rewind the latter with new wire, and one that cannot be intrusted to the ordinary mechanic who may have charge of the dynamo or motor, so that when an accident of this sort happens it is necessary to remove the armature and send it to the factory for repairs. This involves a considerable expense, as well as a great loss of time and its accompanying inconvenience; and it is the purpose of my invention to remove these objections by so modifying the structure of the armature that the destructible portions may be made of uniform size, so as to be readily interchangeable, and also so that such parts may be easily and quickly applied to the armature or removed therefrom, placing it in the power of persons who know nothing about the winding of armatures or the principles governing the same to readily make any repairs likely to become necessary in ordinary use. Numerous attempts have been made to accomplish this same purpose by dividing the core of the armature into sections independently detachable from the whole and winding each section with one or more coils of wire either wound directly upon the section or wound upon a bobbin and then slipped upon the same. While these devices have possibly simplified somewhat the construction and repair of armatures, yet they have still left room for great improvement.

The chief difficulty encountered in the use of such improved armatures is due to the fact that binding-wires or supporting-bands have been used to hold the coils of wire in place, which wires or bands must necessarily be removed before any of the parts can be taken from the frame. My invention consists, broadly, in forming an armature-core of sections, which are themselves provided with means for confining the wire coils against the centrifugal force produced by rapid rotation.

In addition to this general improvement I have made minor and supplementary improvements, which will fully appear below.

I do not limit myself to any particular construction, as a great variety would answer the general purposes of my invention more or less satisfactorily. I shall, however, proceed to describe fully and specifically my preferred construction, together with a few modifications thereof, and shall then point out and define the essential features of said invention, both broadly considered and in connection with certain minor and supplementary improvements below described.

In the drawings presented herewith, Figure 1 is an end view of an armature embodying my improvements. Fig. 2 is a top view of the same. Figs. 3 and 4 are detail views. Fig. 5 illustrates a modification. Fig. 6 is a detail section, and Figs. 7 and 8 illustrate an application of my improvements to a disk-armature.

Applying reference-letters to the different parts shown in these drawings, A is an arbor or shaft upon which the armature is carried. B is a commutator mounted upon said shaft. C C' are end plates or spiders, supported upon the arbor A and rigid therewith, and D is a hollow cylindrical iron core supported between the spiders C C'. This core is composed of a large number of thin metal plates $d$, stamped out in the form shown in Fig. 4. When a sufficient number of these plates are arranged as seen in said figure, they form a thin ring or annular disk, the square projection $d^4$ fitting into notches $d^5$ and having holes $d^6$ stamped through them. The inside of the disk contains a series of notches $d^3$, and the outside is bridged over by projecting tongues $d^7$, so as to leave openings $d^2$ near the periphery. The plates $d$ are coated upon one side with suitable insulating material, and in constructing the core these rings are built up one upon the other until they form a cylinder of the desired length. In actual practice, however, the plates $d$ are not put together in rings at first, but are piled up until they form a section of the length of the cylinder desired, the cross-section of which is equal to the flat side of one of the metal plates. A rod $d'$ is then passed through the holes provided in the plates, securing them all together. When the sections are placed together to form the cylinder, the openings $d^2$ become channels, extending from end to end thereof, and the notches $d^3$ become longitudinal grooves upon the inner surface of the cylinder. Coils E of insulated wire are wound of uniform size and shape, as seen reduced in Fig. 3, and preferably wound or otherwise coated with suitable insulation $e$. These coils are fitted to the channels $d^2$ and grooves $d^3$, so that when a section of the cylinder formed by the plates $d$, arranged side by side, is separated from the other sections a coil can be slipped into place or removed without winding or unwinding. After all of the laminated sections are fitted with coils and arranged in the form of a ring, the spiders C C' are secured to the ends of said ring by means of the pins $d'$. The ends of the wire forming each coil are connected, respectively, with those of the adjacent coils and the joints between the same connected by wires F to the parts of the commutator. The spider C may be secured to the arbor A in any suitable manner; but the spider C' should be made movable longitudinally thereof and provided with a clamping device by means of which it can be secured in any desired position, and also readily moved therefrom to permit of the insertion or removal of the armature or any portion thereof. Fig. 6 illustrates a construction which answers the purpose, the clamping device consisting of a set-screw $c$, threaded to the spider and bearing upon the surface of the arbor.

It will readily be seen that the above construction renders the different sections of the ring, together with the coils carried thereby, entirely distinct and separable from each other, except as they are connected by the supporting-spiders and the connected ends of the wire coils. This is the important feature of our invention, and the advantages gained by it are of great value, both in the first construction of the armature and in repairs that may be required later. It enables the coils E to be wound by machinery before they are applied to the core of the armature. This is a great saving, as in the winding of armatures of this class it has been necessary heretofore to employ skilled labor, whereas with proper machinery these coils can be wound by boys or ignorant persons whose time is of little value. A large amount of time is also saved, as will readily be seen by any one who reflects upon the difference between winding a coil of wire upon a bobbin rotated by machinery and winding such a coil about the shell of a cylinder, passing the wire through the interior of the latter at each turn. It is the intention to manufacture coils of uniform sizes to fit the differently-proportioned armatures required and to furnish these coils in any desired quantities ready for application. If in the use of an armature a coil burns out, it will be detached from the adjacent coils, the screw $c$ loosened, the spider C' slipped off of the armature, the section of the core bearing the injured coil drawn out, said coil removed and a new one put in its place, the section returned to its position, the spider C' replaced, the ends of the new coil joined to those of its neighbors, and the armature will be again ready for use. It is hard to conceive how a person, even if not possessed of the slightest mechanical ability, can fail to perform so simple an operation after having once been shown how it is done.

In Fig. 5 an additional improvement in the construction of the spiders C C' is shown. Said improvement consists in making said spiders of a central portion $c^2$ and of two or more separate outside portions $c^3$, removably secured to the central portion. This may be thought preferable in some instances, as it will enable an injured part to be taken out and replaced without disturbing any of the outside sections of the spiders except the one in which the injured part is located.

My preferred construction has a very important advantage due to the construction of the armature in separable longitudinal sections, to which the coils of wire may be readily applied before the sections are put together, and to the provision upon each of these sections of projecting tongues $d^7$, which, when the sections are assembled in the form of a cylinder, close in over the outside of the coils and retain the latter in place. This dispenses with the necessity for the use of binding-wires, thereby enabling the armature to be brought much nearer to the field-magnets and rendering the motor much more efficient. The outside of the cylinder presents a continuous metallic surface which can be trued up and accurately centered by placing the armature in a lathe and turning it down until the surface of the armature becomes a perfect cylinder concentric with the axis of the journals.

Figs. 7 and 8 illustrate the application of certain of my improvements to what is technically known as a "disk-armature." The plates $d$ are here made similar in shape to those before described, except that they have projecting tongues $d^7$ at both sides. These plates are built up radially and of course gradually decrease in size from the periphery of the armature inward. The sections of this armature are slipped into place or removed in radial lines, and the rods $d'$ necessarily radiate from the shaft of the armature. A metal band M is placed about the entire armature to aid in holding it securely together.

It will be noticed that all of the advantages heretofore mentioned in connection with the cylinder-armature are present in this modified application to a disk-armature. The flat faces of the disk can be turned down into perfect planes perpendicular to the axes of the journals, and hence can be brought as near as may be desired to the faces of the field-magnets.

I claim as new and desire to secure by Letters Patent—

1. In an armature of the class described, the combination, with suitable supporting devices, of a series of separable longitudinal sections, a series of coils of wire mounted upon these sections and wound parallel to the axis of rotation, and portions rigid with the sections projecting outside of the coils of wire and adapted to retain them in place against centrifugal force, substantially as described.

2. In a device of the class described, a ring or disk armature composed of a series of separable sections, a series of coils of wire mounted upon these sections, and a series of tongues rigid with the sections projecting between the coils and the field-magnets, whereby the coils are retained in place and prevented from striking the field-magnets, substantially as described.

BARRON D. SOUTHARD.

Witnesses:
 H. BITNER,
 C. P. SMITH.